(12) United States Patent
Ishikawa et al.

(10) Patent No.: US 6,179,447 B1
(45) Date of Patent: Jan. 30, 2001

(54) STROBE LIGHT DISTRIBUTION LENS AND ZOOM STROBE

(75) Inventors: Tuyoshi Ishikawa, Tokyo; Minoru Iida, Kanagawa-ken, both of (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/025,359

(22) Filed: Feb. 18, 1998

(30) Foreign Application Priority Data

Feb. 19, 1997 (JP) .................................................. 9-034889

(51) Int. Cl.[7] ........................................................ F21V 8/00
(52) U.S. Cl. .............................. 362/277; 362/18; 362/333; 362/339; 362/322; 362/308
(58) Field of Search ......................... 362/359, 16, 277, 362/291, 282, 285, 334, 335, 340, 347, 361, 306, 322, 187, 308, 309, 270; 359/619, 20, 457, 454

(56) References Cited

U.S. PATENT DOCUMENTS

| 5,055,976 | 10/1991 | Arai . | |
|---|---|---|---|
| 5,160,192 | 11/1992 | Sugawara . | |
| 5,280,315 | * 1/1994 | Nomura et al. | 362/359 |
| 5,539,622 | 7/1996 | Ishikawa . | |
| 5,641,218 | * 6/1997 | Sakurai | 362/16 |

FOREIGN PATENT DOCUMENTS 7-110513   4/1995   (JP) .

* cited by examiner

Primary Examiner—Stephen Husar
Assistant Examiner—Bertrand Zeade
(74) Attorney, Agent, or Firm—Greenblum & Bernstein P.L.C.

(57) ABSTRACT

In a light distribution lens for a strobe provided in front of a strobe light emitter to gather strobe light, one of opposed lens surfaces is made of a convex surface, and the other lens surface is made of a convex Fresnel surface. A zoom strobe device is also disclosed, which includes a light emitter unit having a light emitter and a reflector, a light distribution lens provided in front of the light emitter unit to gather light emitted from the light emitter, and a zoom device for varying the distance between the light emitter unit and the light distribution lens.

14 Claims, 6 Drawing Sheets

STROBE LIGHT DISTRIBUTION LENS AND ZOOM STROBE

BACKGROUND OF THE INVENTION

1. Field of the Invention

The present invention relates to a light distribution lens of a strobe device which is located in front of a light emitter and a zoom strobe device using the same.

2. Description of the Related Art

A strobe device, and particularly a strobe device incorporated in a zoom lens camera should be small and have a large guide number and a uniform emission distribution over the entire zoom range from the telephoto extremity to the wide-angle extremity (i.e., least loss of the quantity of light at the periphery of the lens), in accordance with an increase in the focal-length at the telephoto extremity. Attempts have been made to improve a light emitting tube, a reflector, and a Fresnel lens (light distribution lens). In particular, the Fresnel lens can have theoretically the same power of an equivalent convex lens, though it be made thinner in size; therefore is useful in reducing the entire thickness of the strobe system. However, a light loss occurs due to the concentric cylindrical surfaces of the annuluses of the Fresnel lens, axes of which being the optical axis, and hence it is difficult to obtain a large guide number. If a bi-convex lens which has no light loss is used, it is possible to obtain a large guide number. However, the bi-convex lens has a large thickness at the center portion thereof, thus resulting in an increase in volume. In addition, it is difficult to obtain the necessary thickness at the peripheral portion. Thus, the bi-convex lens makes it difficult to miniaturize the strobe device.

SUMMARY OF THE INVENTION

It is an object of the present invention to provide a light distribution lens for a strobe wherein the thickness can be made thinner than an equivalent bi-convex lens; to reduce the light loss due to the annuluses (concentric grooves); and an increased guide number.

Another object of the present invention is to provide a zoom strobe device using the above-mentioned light distribution lens.

According to an aspect of the present invention, there is provided a light distribution lens for a strobe which is located in front of a strobe light emitter, including a convex surface which is provided on one of the opposed lens surfaces of the light distribution lens; and a convex Fresnel surface which is provided on the other lens surface of the light distribution lens.

According to another aspect of the present invention, there is provided a zoom strobe device including a light emitter unit including a light emitter and a reflector; a light distribution lens provided in front of the light emitter unit to distribute strobe light; and a zoom mechanism for varying the distance between the light emitter unit and the light distribution lens. One of opposed lens surfaces of the light distribution lens is made of a convex surface, and the other lens surface is made of a convex Fresnel surface. The convex Fresnel surface faces the light emitter unit while the convex surface is located so that it faces outward.

Preferably, the Fresnel surface is provided with annuluses, each being defined by a cylindrical surface having an axis coincident with the optical axis and a conical surface to define a wedge shape in section. Consequently, a molding die used to mold the Fresnel lens can be easily machined or produced.

The strobe light distribution lens preferably satisfies the following relationship:

$$\theta \leq 10 H$$

wherein H (mm) represents the distance of each annulus of the convex Fresnel surface from the optical axis, and $\theta(°)$ represents the angle defined by the wedge surface of each annulus and a plane perpendicular to the optical axis.

The radius of curvature of the convex surface is preferably larger than that of the basic curved surface of the Fresnel surface (at the center portion thereof). This is because if the radius of curvature of the convex surface is small, the lens must be thick to obtain a necessary thickness of the lens at the peripheral portion thereof. In order to provide a thin lens without decreasing the power, it is preferable that the power be chiefly provided by a Fresnel surface.

The present disclosure relates to subject matter contained in Japanese Patent Application No. 09-34889 (filed on Feb. 19, 1997) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
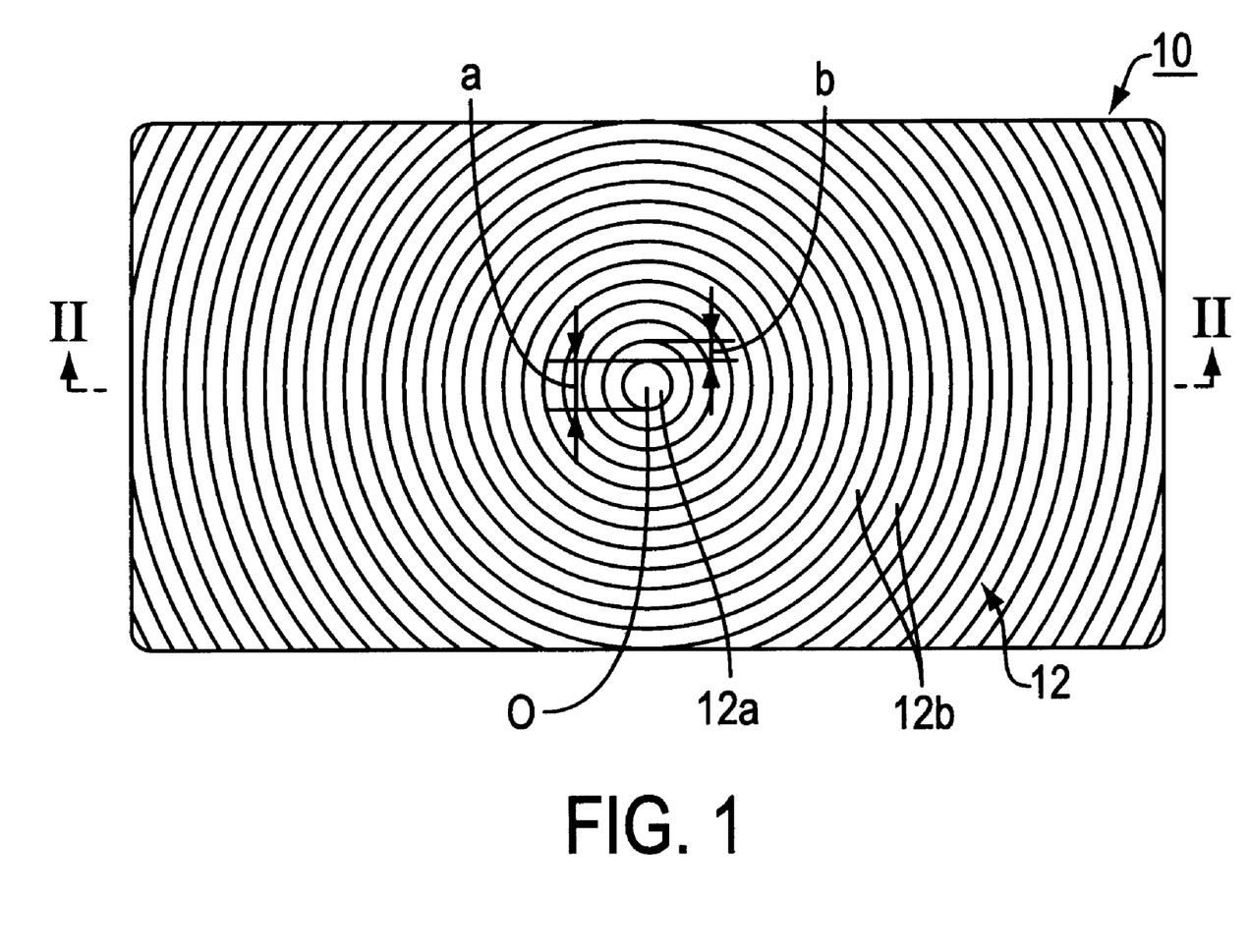
FIG. 1 is a front elevational view of a light distribution lens for a strobe device according to the present invention.
Figure 2:
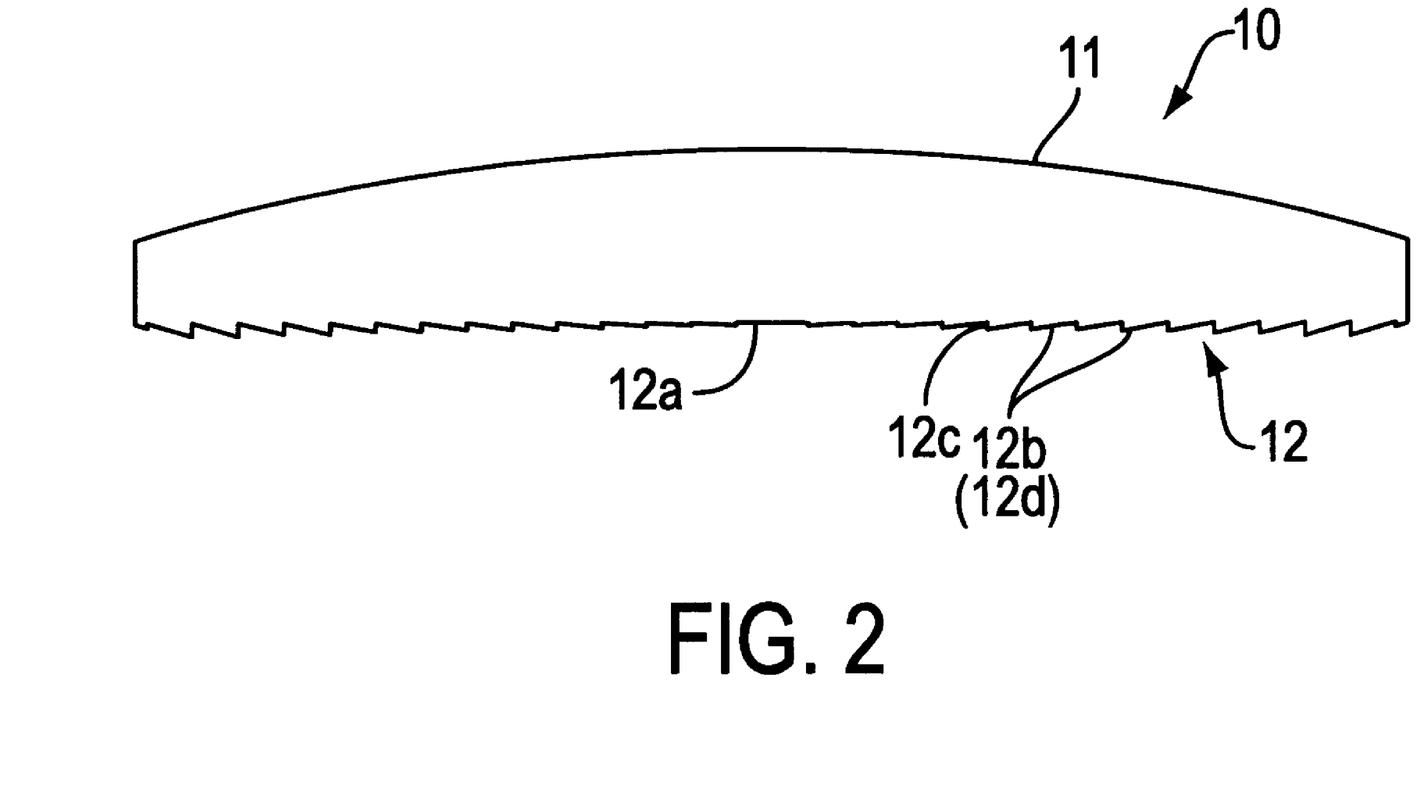
FIG. 2 is a sectional view taken along the line II—II in FIG. 1.

FIGS. 1 and 2 show an embodiment of a light distribution lens 10 for a strobe device according to the present invention. The light distribution lens 10 is in the form of a rectangle in a front elevation, which is elongated in the direction parallel with the length of a light emitting tube. The light distribution lens 10 is provided with a convex surface 11 and a convex Fresnel (lens) surface 12.

Figure 3:
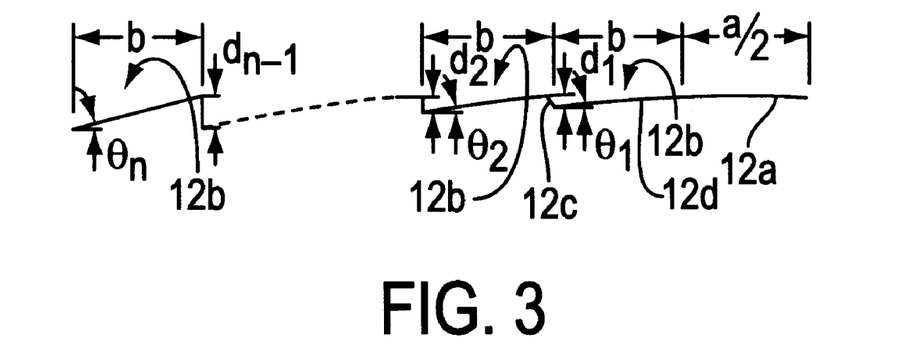
FIG. 3 is an enlarged sectional view of a Fresnel lens portion of a light distribution lens shown in FIG. 1.

The convex Fresnel surface 12 is provided with a circular portion 12a whose center is located on the optical axis O and a group of concentric annuluses (concentric grooves) 12b which are concentrically spaced at an equi-distance. The diameter "a" of the central circular portion 12a is not larger than twice the width "b" of each annulus 12b. The circular position 12a is a semi-spherical surface or a planar surface. Each annulus 12b is provided with a cylindrical surface 12c whose axis is the optical axis O and a conical surface 12d to define a wedge surface in cross section. The angle $\theta(°)$ of the wedge surface (i.e., an angle defined by the wedge surface and a plane perpendicular to the optical axis O) is gradually increased from the center portion toward the peripheral portion. In FIG. 3, assuming that the wedge angles of the annuluses 12b are represented by $\theta_1, \theta_2, \theta_3, \ldots \theta_i, \ldots \theta_n$, in this order from the center toward the peripheral portion, and the distance of the annulus 12b from the optical axis O is represented by H (mm), there is the following relationship:

$$\theta_i \leq 10 H$$

If this relationship is satisfied, an improved light distribution lens for a strobe in which little light loss occurs, a good light distribution property is obtained, and the thickness is smaller than a bi-convex lens can be provided.

In the case that the wedge angle of the Fresnel lens is increased from the center portion toward the peripheral portion, it is preferable that the increment be decreased as the distance from the center increases. If the angle $\theta(\theta_i)$ is above 10H, it is difficult to machine the wedge surfaces (or wedge surfaces of a molding die which is used to mold the convex Fresnel surface 12).

The light distribution lens 10 is generally designed to have different curvatures on front and back surfaces thereof. The surface that has a larger radius of curvature is formed by the convex surface 11, and the surface that has a smaller radius of curvature is formed by the convex Fresnel surface 12. The angle $\theta_i$ is determined in accordance with the basic curved surface which is needed to optically function as the convex Fresnel surface 12.

The convex surface 11 can be made of either a spherical surface or an aspherical surface. The cylindrical surfaces 12c and the conical surfaces 12d of the convex Fresnel surface 12 are each preferably made to have a simple shape that is formed by straight lines in cross section, so that the wedge surfaces (i.e., wedge surfaces of a molding die used to mold the convex Fresnel surface 12) can be easily produced. Either the convex surface 11 or the convex Fresnel surface 12 can be an external surface of the light distribution lens 10 (strobe device) from the viewpoint of an optical function, but preferably, the convex surface 11 is located to face outward in order to provide a good outer appearance and to prevent foreign matter from collecting on the edge portions of the annuluses.

Figure 4:
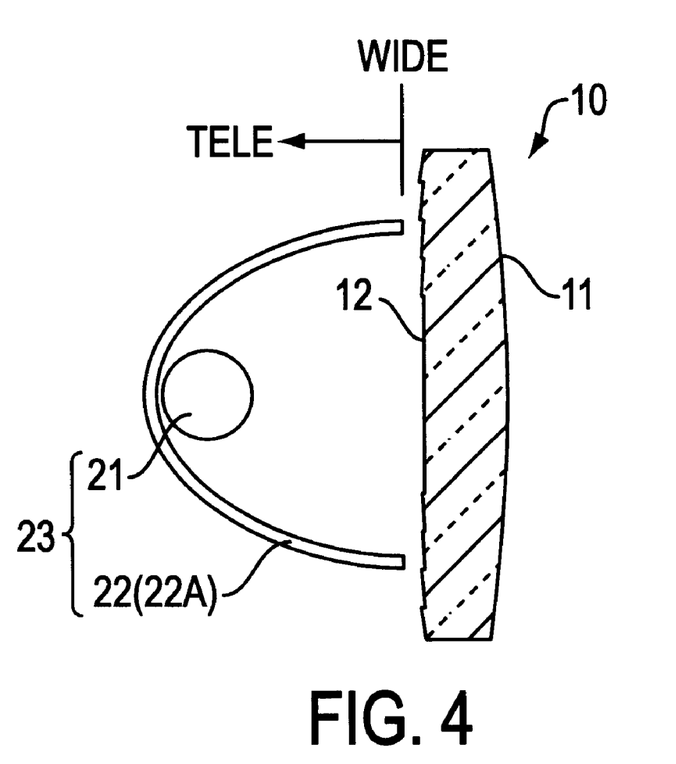
FIG. 4 is a sectional view of a zoom strobe device according to an embodiment of the present invention.
Figure 5:
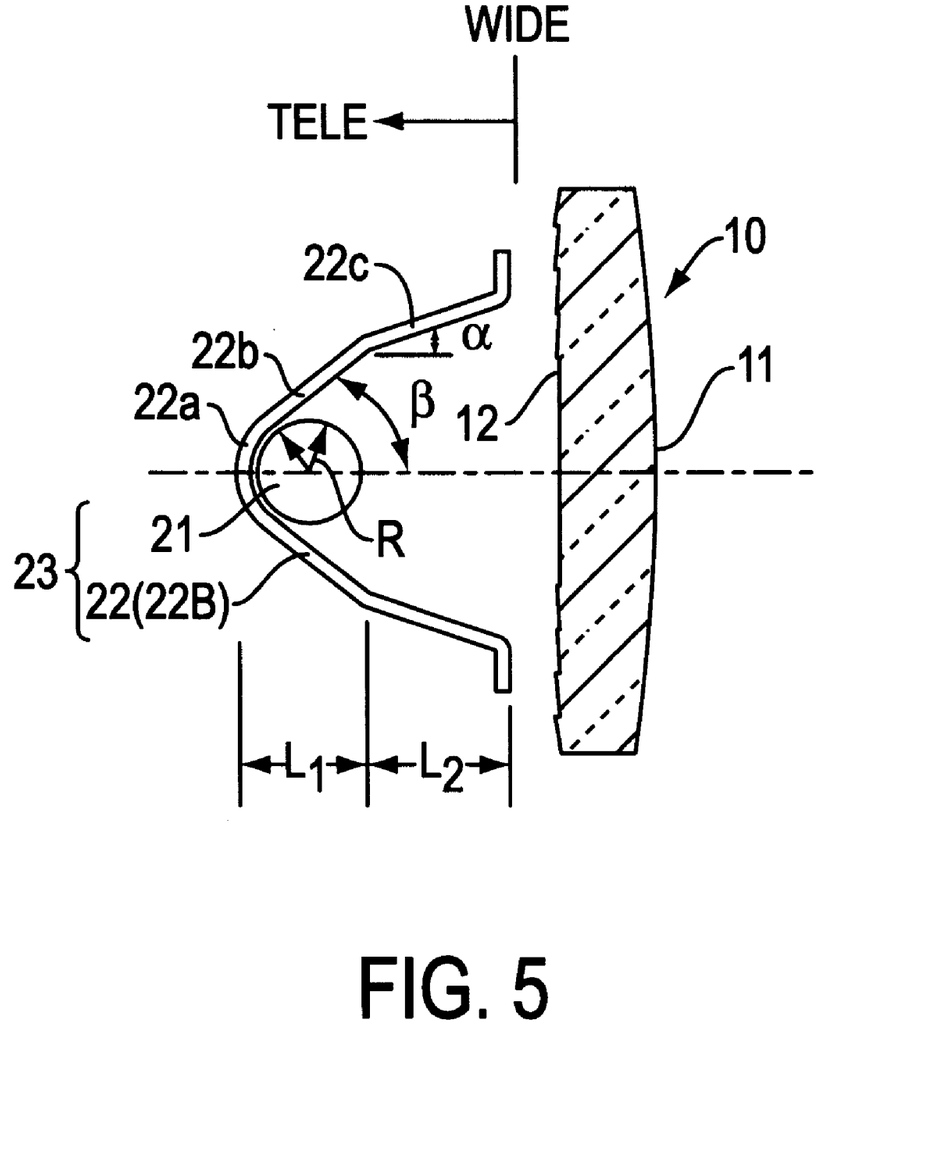
FIG. 5 is a sectional view of a zoom strobe device according to another embodiment of the present invention.

FIGS. 4 and 5 show two embodiments of a zoom strobe device using the strobe light distribution lens 10. In each embodiment, the zoom strobe device is composed of a light emitter unit 23 comprised of a light emitting tube (xenon tube) 21, a reflector 22 and a zoom mechanism (not shown). The light emitter unit 23 is moved close to or away from the strobe light distribution lens 10 to vary the emission angle. In FIG. 4, the reflector 22 is made of a conventional reflector 22A whose sectional shape is elliptical. In FIG. 5, the reflector 22 constitutes a reflector 22B whose sectional shape is defined by a curved portion 22a corresponding to the back surface shape of the light emitting tube 21, first planar portions 22b which correspond to tangential lines to the curved portion 22a, and second planar portions 22c which extend from the front ends of the first planar portions 22b and are bent inward at a predetermined angle. Angles between the first planar portions 22b and the optical axis and between the second planar portion 22c and the optical axis in cross section are defined by $\alpha$ and $\beta$, respectively as shown in FIG. 5. Also, the total length of the curved portion 22a and the first planar portion 22b and the length of the second planar portion 22c in the optical axis direction are defined by $L_1$ and $L_2$, respectively. The reflector 22B is disclosed in Japanese Unexamined Patent Publication No. 7-110513 in the name of the assignee of the present invention.

A zoom mechanism (not shown) is used for varying the distance between the light emitter unit and the light distribution lens. The zoom mechanism per se known can be, for example, a cam mechanism, driven in accordance with the movement of the photographing lens.

In FIG. 4 or 5, when the light emitter unit 23 is moved close to the light distribution lens 10, the emission angle (illumination angle) is increased (wide-angle) and when the light emitter unit 23 is moved away from the light distribution lens 10, the emission angle is decreased (telephoto).

Numerical data in examples of the present invention and a comparative example will be discussed below.

<Common data of strobe light distribution lens 10>
Diameter "a" of the circular portion 12a=1 mm
Distance "b" between the annuluses 12b=0.5 mm
Number of the annuluses 12b=14

EXAMPLE 1

<Data of strobe light distribution lens 10>
Refractive index $N_d$=1.49176
Radius of curvature of the convex surface 11=39.5 mm
Basic radius of curvature of the convex Fresnel surface 12=8 mm (K<conic constant>=−7.5)

EXAMPLE 2

<Data of strobe light distribution lens 10>
Refractive index $N_d$=1.49176
Radius of curvature of the convex surface 11=39.5 mm
Basic radius of curvature of the convex Fresnel surface 12=11 mm (K=−7.5)

EXAMPLE 3

<Data of strobe light distribution lens 10>
Refractive index $N_d$=1.49176
Radius of curvature of the convex surface 11=39.5 mm
Basic radius of curvature of the convex Fresnel surface 12=16 mm (K=−13.0)

COMPARATIVE EXAMPLE

<Light distribution lens made of a bi-convex lens)
Refractive index $N_d$=1.49176
Radius of curvature of the front surface=39.5 mm
Radius of curvature of the back surface=8 mm
Numerical Values of $\theta$ and H in each Embodiment

| | | $\theta$ | | |
|---|---|---|---|---|
| annulus No. | H | Example 1 | Example 2 | Example 3 |
| 0 | 0 | 0.00 | 0.00 | 0.00 |
| 1 | 0.5 | 3.53 | 2.59 | 1.78 |
| 2 | 1.0 | 6.79 | 5.06 | 3.50 |
| 3 | 1.5 | 9.60 | 7.34 | 5.10 |
| 4 | 2.0 | 11.90 | 9.37 | 6.54 |
| 5 | 2.5 | 13.73 | 11.13 | 7.82 |
| 6 | 3.0 | 15.17 | 12.62 | 8.94 |
| 7 | 3.5 | 16.28 | 13.88 | 9.89 |
| 8 | 4.0 | 17.15 | 14.93 | 10.70 |

-continued

| annulus No. | H | θ | | |
|---|---|---|---|---|
| | | Example 1 | Example 2 | Example 3 |
| 9 | 4.5 | 17.83 | 15.81 | 11.39 |
| 10 | 5.0 | 18.38 | 16.54 | 11.97 |
| 11 | 5.5 | 18.81 | 17.15 | 12.47 |
| 12 | 6.0 | 19.17 | 17.66 | 12.88 |
| 13 | 6.5 | 19.45 | 18.10 | 13.24 |
| 14 | 7.0 | 19.69 | 18.46 | 13.55 |

Figure 6:
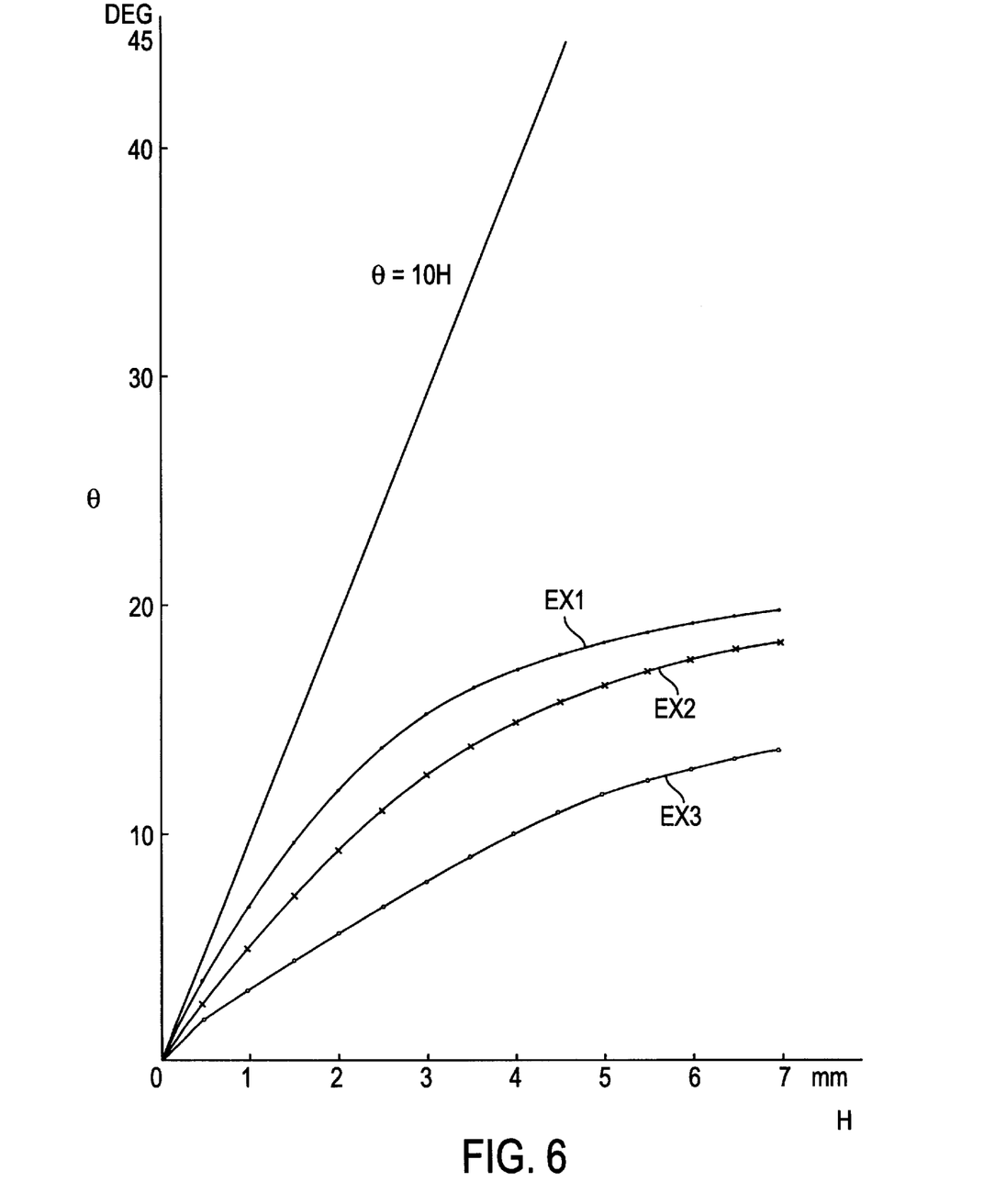
FIG. 6 is a graph showing an angle distribution of wedge surfaces of annuluses or concentric grooves of a Fresnel lens portion in a light distribution lens for a strobe device according to the present invention; and, FIG. 7 is a graph showing a change in the guide number of a zoom strobe device using a light distribution lens shown in FIG. 4.

FIG. 6 is a graph showing the relationship between the values of θ and H in the three examples mentioned above. It can be found that each example satisfies the relationship defined by $\theta \leq 10H$.

Figure 7:
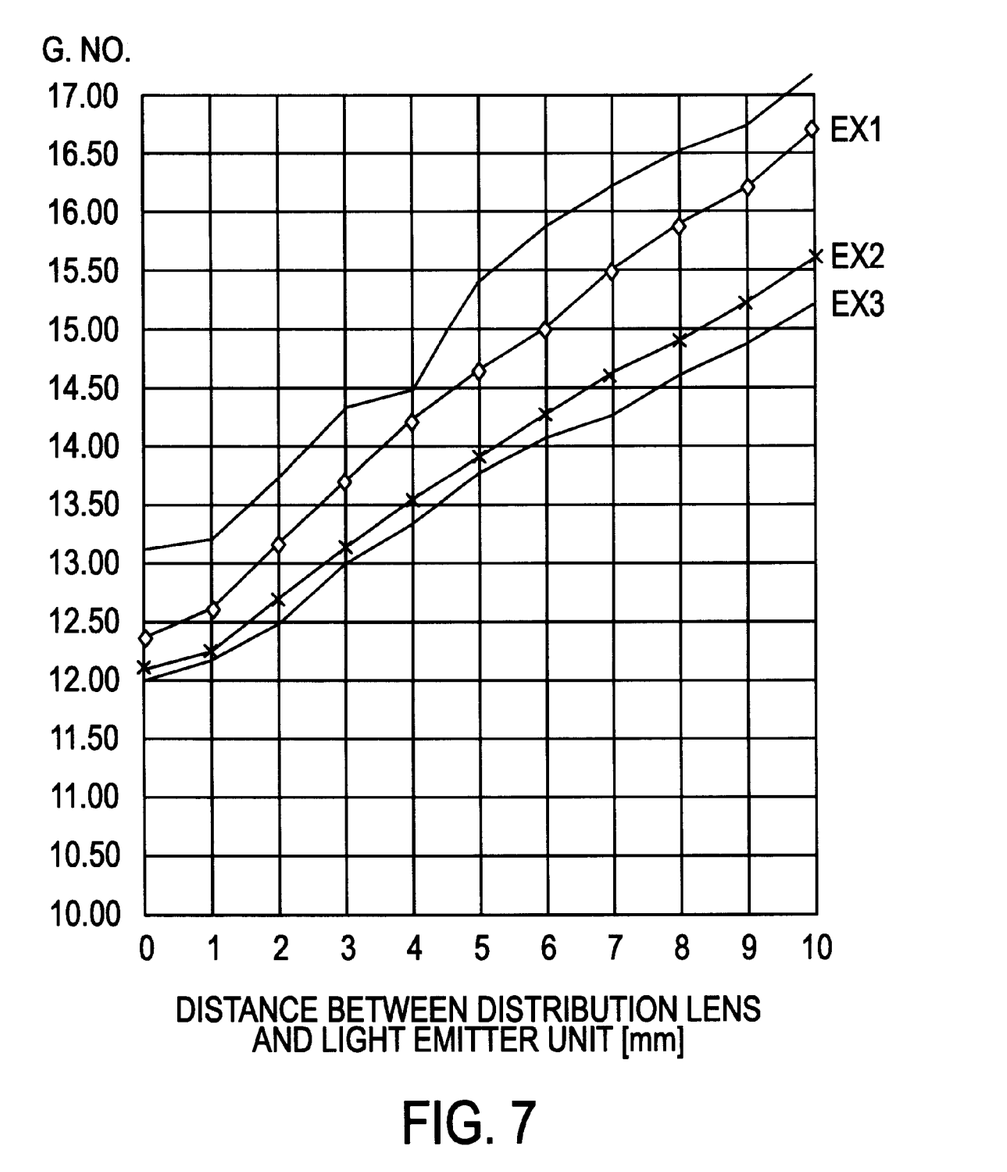

FIG. 7 is a graph showing the guide numbers of the four kinds of zoom strobe devices which are comprised of the light distribution lenses 10 according to Examples 1, 2, 3 and the comparative example, and the reflector 22B shown in FIG. 5 in combination, when the distance between the light distribution lens 10 and the light emitter unit 23 is varied. The position in which the light distribution lens 10 is closest to the light emitter unit 23 (distance=0) corresponds a 35 mm focal-length of the photographing lens, and the position in which the light distribution lens 10 is farthest from the light emitter unit 23 (distance=10 mm) corresponds to a 115 mm focal-length of the photographing lens.

<Data of the light emitter unit 23>
Diameter of the light emitting tube 21=2.3 mmφ
α=18.52°
β=38.85°
$L_1$=2.3 mm
$L_2$=2.8 mm In Example 1, a basic curved surface of the convex Fresnel surface 12 is 8 mm, as in the comparative example. Nevertheless, the reduction in the guide number is smaller than that in the comparative example or no significant differences between the two. Namely, it can be found that the light loss caused by the use of the Fresnel surface can be minimized in the present invention. The power of the Fresnel surface in Example 2 is slightly weaker than that in Example 1. Consequently, the guide number is slightly reduced, but the improvement of the light distribution property is confirmed in Example 2. In Example 3, the power of the Fresnel surface is further weakened. Alternatively, it is possible to weaken the power of the convex surface without weakening the power of the Fresnel surface. In this alternative, the radius of curvature of the convex surface is increased, so that if the thickness of the lens is reduced, the necessary thickness of the lens at the peripheral portion can be obtained. Consequently, the lens can be made thin, thus resulting in a realization of a compact strobe device.

As can be understood from the above discussion, according to the present invention, an improved light distribution lens for a strobe in which the lens thickness is smaller than a bi-convex lens; little light loss caused by the cylindrical surfaces of the annuluses of the Fresnel lens occur; and the guide number can be increased can be provided. Also, a zoom strobe device using the improved light distribution lens can be provided.

What is claimed is:

1. A light distribution lens for a strobe which is located in front of a strobe light emitter, comprising:
a convex surface which is provided on one surface of said light distribution lens; and
a convex Fresnel surface which is provided on the other opposing lens surface of said light distribution lens;
wherein said Fresnel surface is provided with annuluses, each being defined by a cylindrical surface having an axis coincident with an optical axis of said light distribution lens and a conical surface to define a wedge shape in cross section;
wherein said light distribution lens satisfies the following relationship;

$$\theta \leq 10H$$

wherein H represents the distance, in millimeters, of each annulus of the convex Fresnel surface from the optical axis, and θ represents an angle, in degrees, defined by a wedge surface of each annulus and a plane perpendicular to the optical axis, respectively.

2. A light distribution lens for a strobe which is located in front of a strobe light emitter, comprising:
a convex surface which is provided on one surface of said light distribution lens; and a convex Fresnel surface which is provided on the other opposing lens surface of said light distribution lens;
wherein a radius of curvature of the convex surface is larger than a radius of curvature of a basic curved surface of the convex Fresnel surface.

3. A zoom strobe device comprising:
a light emitter unit including a light emitter and a reflector;
a light distribution lens provided in front of said light emitter unit to distribute strobe light; and
a zoom mechanism for varying the distance between said light emitter unit and said light distribution lens;
wherein one lens surface of said light distribution lens is a convex surface, and the other lens surface is a convex Fresnel surface; and
wherein said convex Fresnel surface faces said light emitter unit and said convex surface faces outward.

4. A zoom strobe device according to claim 3, wherein said Fresnel surface is provided with annuluses, each being defined by a cylindrical surface having an axis coincident with the optical axis and a conical surface to define a wedge shape in cross section.

5. A zoom strobe device according to claim 4, wherein said strobe device satisfies the following relationship;

$$\theta \leq 10H$$

wherein H represents the distance, in millimeters, of each annulus from the optical axis, and θ represents the angle, in degrees, defined by the wedge surface of each annulus and a plane perpendicular to the optical axis.

6. A zoom strobe device according to claim 3, wherein the radius of curvature of the convex surface is larger than that of the basic curved surface of the Fresnel surface.

7. The zoom strobe device according to claim 3, said light distribution lens having only a single Fresnel surface.

8. The light distribution lens according to claim 1, wherein said light distribution lens is adapted for use with a mechanism for varying a distance between said light emitter unit and said light distribution lens.

9. The light distribution lens according to claim 1, said other opposing lens surface of said light distribution lens facing towards the strobe light emitter.

10. The light distribution lens according to claim 2, wherein said light distribution lens is adapted for use with a mechanism for varying a distance between said light emitter unit and said light distribution lens.

11. The light distribution lens according to claim 2, said other opposing lens surface of said light distribution lens facing towards the strobe light emitter.

12. The light distribution lens according to claim 2, said convex surface being a non-Fresnel surface.

13. The zoom strobe device according to claim 3, said convex surface being a non-Fresnel surface.

14. The light distribution lens according to claim 2, said light distribution lens having a single Fresnel surface.

* * * * *